United States Patent Office 3,291,585
Patented Dec. 13, 1966

3,291,585
METHOD FOR THE TREATMENT OF RAW GLASS MATERIAL CONTAINING EASILY VOLATILIZABLE INGREDIENTS
Tsuneo Okamura, Yokohama, Japan, assignor to Asahi Glass Co., Ltd., Tokyo, Japan, a corporation of Japan
No Drawing. Filed Apr. 16, 1963, Ser. No. 273,321
4 Claims. (Cl. 65—18)

The present invention relates to a method for the treatment of raw glass material containing easily volatilizable ingredients. More particularly it relates to a method of treating raw glass materials at the time when poisonous and easily volatilizable substances such as, for instance, selenium, sulfur, arsenic, antimony and tellurium are supplied to a glass melting furnace as an additive ingredient.

Various sorts of glasses have been hitherto known, which contain selenium, sulfur, arsenic, antimony and/or tellurium. In the manufacture of glass of such type containing these ingredients alone or in combination, these ingredients are supplied to a glass melting furnace in the form of metal element or chemical compound or raw material, containing the said ingredients and then melted in the furnace, as is the case of melting other raw glass materials in a usual glass melting furnace. However, their boiling temperatures being low, selenium, sulfur, arsenic, antimony and tellurium are, to the greater part, vaporized and, as a result, only an extremely small proportion of the added substances remain as the effective ingredients in the glass produced.

Selenium is known as an effective additive ingredient for glass for optical filters, glass for absorbing rays having specific wave length ranges and gray glass. Such glasses will be described by way of example in the following. For instance, it is normally necessary to charge selenium into a glass melting furnace in an amount of from 0.1 to 0.2% by weight, calculated on the molten glass, in order to make glass containing 0.0005 to 0.001% by weight of selenium.

One object of the present invention is to increase the proportion of added material remaining in the glass obtained, when a raw glass material (glass batch) containing one or more of low boiling point ingredients, such as selenium, sulfur, arsenic, antimony and tellurium is melted in the glass melting furnace.

Another object of the present invention is to improve the operating environment by diminishing and lessening the evolution of poisonous gases at the time of melting raw glass material containing selenium, sulfur, arsenic, antimony and/or tellurium which give rise to the evolution of extremely poisonous vapor, when supplied to the glass melting furnace.

A further object of the present invention is to facilitate the operation control, by rendering the proportion of efficient ingredient remaining in the finished glass quantitative.

After numerous experiments and laborious studies, the present inventor has come to the conclusion that when, in charging of additive material containing ingredients, which are easily volatile and their vapors are highly poisonous at the time of melting in a glass melting furnace (hereafter shortly referred to as "additive material"), in the glass melting furnace, said additive material and powdered glass cullet are mixed in a weight ratio of 0.05 to 30% of additive material to the glass cullet and the resulting mixture is then sintered and thereafter the sintered material is charged and melted in the glass melting furnace, the proportion of the additive component remaining incorporated in the glass product can be kept in an increased amount and simultaneously, the additive ingredient in the raw material thus treated can almost quantitatively be retained in the glass at the time of melting. The present invention is based on this newly established finding.

Glass cullet used in the present invention is one manufactured by vitrifying and pulverizing once fused glass mass. As a glass cullet such a glass cullet as produced in the course of glass making (returned cullet) is used on an industrial scale. However, there is no restriction to such glass cullet and any other cullet can also be used.

On the other hand, in order to increase the amount of the additive ingredient retained in the sintered material, it is desirable that the viscosity of the glass cullet in the vicinity of the temperature corresponding to the boiling point of the additive ingredient be more than $1 \times 10^7$ poises. For instance, when selenium having the boiling point of 688° C. is used, the viscosity of the glass cullet at 600 to 700° C. preferably is $1 \times 10^{10}$ to $1 \times 10^7$ poises.

The mixing ratio of the additive material to the glass cullet is chosen in the range of 0.05 to 30% by weight to the glass cullet. If said ratio is set below 0.05%, the quantity of the additive material remaining in the resulting glass shows no variation, and the treating amount is increased abruptly so that it is not advantageous industrially. If the ratio is above 30%, the volatilizing amount of the additive ingredient will increase, and thus, the proportion retained will abruptly be lowered.

The raw material of the additive ingredient is thoroughly mixed with the pulverized glass cullet and then sintered. The sintering temperature ranges from 500 to 1200° C., depending upon the compositions of the said additive ingredient and the glass cullet used.

According to the sintering, a part of the additive ingredient is dissolved into the glass cullet, another part is absorbed and a further part is occluded in the interior thereof in a gaseous state, and when the sintered cullet is charged in the glass melting furnace, the additive material is rapidly dissolved in glass and vitrified, thereby improving the effective proportion retained in the finished glass.

In the above-mentioned sintering treatment, if the said raw additive material and glass cullet are previously mixed and then pressed, clearances between each particle are made narrower by pressing, and heat conductivity improved and thus, the air existing therein escapes out and the sinter improved.

The pressing operation is carried out by a usual pressing machine, and, if necessary, a suitable substance having the required bonding action may be added; the pressing is most effectively carried out under 60 to 500 kg./cm.$^2$.

The raw material of additive ingredient in the present invention means raw material containing additive ingredients and contains metal, element, chemical compound and raw glass material.

The invention is further disclosed in the following example, which is illustrative but not limitative thereof.

*Example*

(A) 100 parts of pulverized glass cullet were thoroughly mixed, in a weight ratio, with 0.4 part of pulverized metal selenium and the resulting mixture was sintered at 950° C.

(B) A mixture similar to the preceding mixture was compressed under a pressure of 500 kg./cm.$^2$ into a rod having a size of 26 mm. diameter and 30 mm. length and was sintered at 950° C.

The remaining amount (percent) of selenium used in the sintered materials (A) and (B) was respectively as follows:

(A) 50% and (B) 70%

Furthermore, the sintered materials (A) and (B) were respectively mixed with raw glass-reciping material raw batch and glass cullet, as indicated below and the resulting mixtures were respectively melted. The remaining amount (percent by weight) of selenium in the glasses obtained was respectively as follows:

| | Sintered material (parts) | Raw glass-reciping material (parts) | Cullet (parts) |
|---|---|---|---|
| (A) | 6.0 | 60 | 34 |
| (B) | 4.3 | 60 | 35.7 |

| | The remaining amount in glass, based on Se in the sintered material (percent) | The percentage of Se, based on the total selenium used (percent) | The percentage of Se in glass (percent) |
|---|---|---|---|
| (A) | 15.0 | 7.5 | 0.0018 |
| (B) | 18.1 | 11.6 | 0.0020 |

Furthermore, in comparison with conventional method, the retained proportion of selenium (percent) to the total charging weight in the case where the similar amount of Se is intended to remain in the glass in the usual method is in the order of 0.15% and the majority thereof is volatilized, whereas 5 to 10% Se can be retained in the glass according to the present invention.

In the practice of the present invention, the results of tests regarding the relationship between the mixing ratio of raw material of additive ingredients (Se and S were used in elementary form; As, Sb and Te in oxide form) and pulverized glass cullet and the remaining amount of the additive ingredients in the sintered materials are as follows:

The mixture was pressed under a pressure of 400 kg./cm.$^2$ and the resulting mass was then sintered at 700 to 1,000° C.

| Amount (weight percent) of additive ingredients to 100 parts of cullet | Additive ingredients and remaining amount (percent) | | | | |
|---|---|---|---|---|---|
| | Se | S | As | Sb | Te |
| 0.01 | 70 | 65 | 88 | 92 | 75 |
| 0.05 | 70 | 65 | 88 | 92 | 75 |
| 0.5 | 70 | 65 | 88 | 92 | 75 |
| 1.0 | 68 | 65 | 86 | 91 | 73 |
| 5.0 | 65 | 63 | 84 | 90 | 70 |
| 10.0 | 60 | 59 | 81 | 87 | 65 |
| 20.0 | 50 | 49 | 75 | 86 | 56 |
| 30.0 | 45 | 45 | 70 | 85 | 52 |
| 40.0 | 40 | 38 | 60 | 75 | 45 |

On the other hand, when the pressing is effected prior to the sintering treatment, the relationship between the pressure of the pressing and the remaining amount of additive ingredients in the sintered materials are as follows:

| Pressure in the pressing (kg./cm.$^2$) | Remaining proportion (percent) of additive ingredients in the sintered materials | | | | |
|---|---|---|---|---|---|
| | Se | S | As | Sb | Te |
| 0 | 50 | 48 | 57 | 68 | 55 |
| 30 | 60 | 62 | 63 | 81 | 67 |
| 60 | 63 | 64 | 79 | 85 | 71 |
| 100 | 65 | 63 | 85 | 90 | 73 |
| 200 | 67 | 64 | 87 | 91 | 73 |
| 300 | 68 | 64 | 87 | 91 | 74 |
| 400 | 69 | 65 | 89 | 92 | 75 |
| 500 | 70 | 68 | 90 | 93 | 76 |
| 600 | 70 | 68 | 90 | 93 | 77 |
| 700 | 70 | 68 | 90 | 93 | 77 |

Furthermore, the relationship between the treating temperature in sintering and the remaining amount of additive ingredients in the sintered material is as follows:

| Sintering temperature (° C.) | Remaining proportion of additive ingredients (percent by weight) in the sintered materials | | | | |
|---|---|---|---|---|---|
| | Se | S | As | Sb | Te |
| 500 | 18 | 30 | 40 | 35 | 25 |
| 700 | 20 | 40 | 55 | 63 | 42 |
| 800 | 25 | 45 | 78 | 80 | 60 |
| 900 | 70 | 65 | 80 | 85 | 77 |
| 1,000 | 65 | 50 | 85 | 89 | 80 |
| 1,100 | 64 | 35 | 70 | 75 | 70 |
| 1,200 | 30 | 30 | 60 | 65 | 40 |

What is claimed is:
1. A method of reducing the losses of an easily volatilizable ingredient in the preparation of molten glass from a glass batch mixture of raw materials including an additive material containing at least one easily volatilizable ingredient which comprises mixing pulverized glass cullet with 0.05% to 30% by weight of said additive material, sintering the resulting mixture at a temperature between 500° C. and 1200° C., then charging the resulting sintered cullet material and the remaining additional batch ingredients of the glass batch mixture into a glass melting furnace and melting the glass batch mixture therein.

2. A method of reducing the losses of an easily volatilizable ingredient in the preparation of molten glass from a glass batch mixture of raw materials including an additive material containing at least one easily volatilizable ingredient selected from the group consisting of selenium, sulfur, arsenic, antimony and tellurium which comprises mixing pulverized glass cullet with 0.05% to 30% by weight of said additive material, sintering the resulting mixture at a temperature between 500° C. and 1200° C., then charging the resulting sintered cullet material and the remaining additional batch ingredients of the glass batch mixture into a glass melting furnace and melting the glass batch mixture therein.

3. The method of claim 2 in which the mixture of pulverized glass cullet and additive material is compressed prior to the sintering treatment.

4. The method of claim 3 wherein such mixture is compressed at a pressure between 60 and 500 kg./cm.$^2$.

References Cited by the Examiner

UNITED STATES PATENTS

| 2,114,545 | 4/1938 | Slayter | 65—18 X |
| 2,284,398 | 5/1942 | Kutchka | 65—27 |
| 3,001,881 | 9/1961 | Slayter | 65—18 |
| 3,121,628 | 2/1964 | Loehrke | 65—18 |
| 3,226,241 | 12/1965 | Miller | 65—18 |

FOREIGN PATENTS

| 2,105 | 5/1876 | Great Britain. |
| 179,408 | 4/1952 | Japan. |

OTHER REFERENCES

Hodkin et al.: Glass Technology, pub. 1925 by Van Nostrand Co., page 129.

DONALL H. SYLVESTER, Primary Examiner.

F. W. MIGA, Assistant Examiner.